United States Patent

[11] 3,577,052

| [72] | Inventor | David Elvis Bauer<br>1800 W. Gromercy #21, Anaheim, Calif. 92801 |
|---|---|---|
| [21] | Appl. No. | 768,295 |
| [22] | Filed | Oct. 17, 1968 |
| [45] | Patented | May 4, 1971 |

[54] AC MOTOR CONTROL SYSTEM WITH SYNCHRONOUS SPEED CHANGE
32 Claims, 11 Drawing Figs.

[52] U.S. Cl. ............................................. 318/230,
318/227, 318/231
[51] Int. Cl. ............................................. H02p 5/28,
H02p 5/40
[50] Field of Search ............................................. 318/227,
230, 231

[56] References Cited
UNITED STATES PATENTS

| 3,141,122 | 7/1964 | Loocke ..................... | 318/148 |
| 3,243,677 | 3/1966 | Cannalte et al. ............. | 318/138 |
| 3,343,063 | 9/1967 | Kenney, Jr. et al. ......... | 321/5 |
| 3,377,543 | 4/1968 | Wouk ....................... | 321/45 |
| 3,394,297 | 7/1968 | Risberg .................... | 318/231X |
| 3,402,336 | 9/1968 | Risberg .................... | 318/231X |
| 2,784,365 | 3/1957 | Fenemore et al. ........... | 318/231X |
| 3,317,805 | 5/1967 | Kay et al. .................. | 318/231 |
| 3,344,326 | 9/1967 | Risberg .................... | 318/231X |
| 3,453,524 | 7/1969 | Dinger ..................... | 318/227X |

Primary Examiner—Gene Z. Rubinson
Attorney—Fowler, Knobbe & Martens

ABSTRACT: A variable DC power source supplies a DC voltage to a static inverter which provides a three-phase alternating voltage output to drive an AC motor. A ring counter which is cycled by a voltage controlled oscillator generates three-phase timing signals to control the frequency of the inverter output. An input control signal is coupled to the voltage controlled oscillator through a rate control means. The rate control means generates a voltage output to the voltage controlled oscillator which is proportional to the input control signal and follows and adjustment of the input control signal from one level to another at a predetermined rate. The output generated by the rate control means also controls the magnitude of the DC voltage output of the DC power source. An adjustment of the input control signal results in a proportional change in the magnitude and the frequency of the inverter output.

Fig. 1.

INVENTOR.
DAVID E. BAUER
BY
FOWLER, KNOBBE
& MARTENS
ATTORNEYS.

AC MOTOR CONTROL SYSTEM WITH SYNCHRONOUS SPEED CHANGE

BACKGROUND OF THE INVENTION

1. Field of the Invention

The present invention relates to AC motor control systems and more particularly, to static systems having proportionally adjustable frequency and voltage output for controlling the speed and torque of an AC motor.

2. Description of the Prior Art

The speed of an AC motor may be controlled by controlling the frequency of the AC voltage applied to it. The torque that an AC motor produces is a function of the frequency of the applied voltage and its magnitude. To maintain a constant torque, a constant flux density in the motor must be maintained. Therefore, any decrease in the frequency of the applied voltage should be accompanied by a proportional decrease in the magnitude of the voltage.

If an AC motor is to be operated over a wide speed range, it is imperative that the magnitude of the applied voltage be controlled in order to limit motor current to a reasonable value. If the voltage is not lowered as the frequency is decreased, the motor could be damaged by high motor currents.

A representative system in the prior art which controls the voltage magnitude and frequency proportionally includes a variable DC power supply which provides a DC voltage to an inverter. The inverter in turn generates a three-phase AC output to drive the motor load. The DC voltage generated by the DC power supply is also connected to a voltage controlled oscillator which controls a frequency control means. The frequency control means generates three-phase signals which are applied to the inverter to control the frequency of the inverter output. An adjustment of the DC power supply to lower the DC voltage output results in both the magnitude and the frequency of the inverter output being lowered proportionally.

The inverter in this system and those in similar systems used in controlling large amounts of power employ silicon controlled rectifiers (SCRs) as the power switching elements. Typically, for each phase of the inverter output two SCRs are connected in series between the DC voltage applied to the inverter and ground. The inverter, therefore, comprises three pairs of SCRs with each pair being connected in parallel with the other pairs. Each phase of the inverter output is derived from a connection intermediate the SCRs in a particular pair so that as the SCRs in that pair are alternately turned on and commutated off, the output of that phase of the inverter is substantially a square wave having a magnitude which steps between the magnitude of the DC voltage and ground. The frequency of the square wave is determined by the output of the frequency control means which controls the conduction frequency of the SCRs.

The commutation or the turning off of the SCRs in the inverter requires that the current through the SCR be reduced to approximately 0 for a minimum amount of time. The most common technique in accomplishing this utilizes an inductor-capacitor (LC) network associated with each SCR. The capacitor is charged from the DC supply while the SCR with which it is associated is conducting. The capacitor is then coupled across the SCR to divert the current which was previously flowing through the SCR for the amount of time necessary to turn it off.

The capacitor must store enough energy while the SCR is conducting to divert the current which is flowing through the SCR for the amount of time necessary to allow the SCR to return to its blocking state. The energy stored in the capacitor is determined by the relationship $E = \frac{1}{2}CV^2$ where V is the voltage charging the capacitor. In a system where the DC supply is variable, the capacitance of the commutating capacitor C must be selected to be large enough so that at the minimum DC supply voltage, enough energy is stored to commutate the SCR. On the other hand, however, for this value of capacitance a much greater amount of energy than is necessary to commutate the SCR is stored when the DC supply has a high DC voltage output. Accordingly, the components in the inverter must be oversized to handle the excess power dissipation which occurs under these conditions, thus decreasing the efficiency and increasing the cost of the inverter. The output voltage range of the inverter is also limited by this commutation technique since obviously there is a limit on the maximum size of capacitors available. Thus to store the minimum amount of energy necessary for commutation, the voltage output of the DC supply may not be reduced below a particular value.

Most inverters are also susceptible to miscommutation. That is, the SCRs being falsely turned on. If this occurs, the energy stored on the capacitor is lost, and, in the prior art inverters, the SCRs cannot be turned off except by removing the inverter from the DC power source. This is an obvious disadvantage for most applications of a motor control system.

Another disadvantage of the prior art systems is their lack of reliability. An AC motor at the instant of starting or under a locked rotor condition is essentially a short circuit. Accordingly, when the system is first turned on or when the motor stalls, high motor currents will appear in the inverter output. Most systems attempt to protect the switching elements of the inverter and the power supply with circuit breakers, fuses, or a combination of both. These devices, however, are generally too slow to prevent damage to the system.

The various techniques for controlling the magnitude of an inverter's output in the prior art include supplying the inverter with a constant DC voltage and connecting a variable autotransformer between the inverter's output and the motor. The magnitude of the AC output of the system is changed by varying the autotransformer. This type of system has a minimum frequency limit due to the autotransformer. The core of the autotransformer will saturate as the frequency of the inverter's output approaches zero since the magnitude of the inverter output to the autotransformer is a constant. This situation may be eased somewhat by providing the autotransformer with a large core. There is a point, however, where it is impractical to increase the core size further due to cost and packaging requirements.

Yet another disadvantage associated with this technique is that a motor driven means must be utilized to vary the output of the transformer. This increases the complexity of the electronics and accordingly the cost of the system.

The magnitude of a motor control system output may also be controlled by vectorially summing the output of two or more inverters through a transformer which is connected to the motor load. Although this eliminates the motor controls necessary in a system utilizing an autotransformer, the frequency range is still limited due to the transformer core and the cost of the system has not been lowered due to the redundant inverters electronics.

The most common method for controlling the magnitude of the inverter output is to control the magnitude of the DC voltage generated by the DC power supply. The DC supply usually includes a transformer having a secondary winding which is coupled to a rectifier and filter circuit through some phase shifting means such as a magnetic amplifier or an SCR circuit. The magnitude of the signal applied to rectifier circuit is varied by controlling the conduction angle of the phase shifting means. This magnitude control technique eliminates many of the problems associated with the previously discussed techniques but has the disadvantage of introducing a considerable amount of ripple into the DC supply output at the lower voltages.

Most frequency control means in the prior art comprise discrete electronic components interconnected to form a counter of some sort. These control means are not reliable unless extensive circuitry is provided in the system to set the components to an initial condition upon starting. This often requires circuitry which will prevent the application of power to the inverter until the control means has been initialized. In addition, the direction of rotation of the three-phase output of a control means cannot be reversed without additional circuitry such as switching relays on the output of the control means.

SUMMARY OF THE INVENTION

The present invention provides a variable DC power source having an output applied to a solid-state inverter section. The inverter generates a three-phase output to drive an AC motor.

An input control signal is connected as an input to a rate control means which generates an output signal proportional to the magnitude of the input control signal. The output of the rate control means is coupled to the DC power source to control the magnitude of the voltage that it supplies to the inverter.

The output of the rate control means is also connected to a voltage controlled oscillator (VCO) which generates a periodic output having a frequency determined by the magnitude of the rate control means output. The VCO output cycle a ring counter which in turn generates three-phase timing signals. The timing signals are coupled to the inverter and control the frequency of the inverter output.

The rate control means responds to a change in the magnitude of the input control signal by changing the magnitude of its output signal from one level to another at a predetermined rate thus controlling the rate of change of the DC voltage supplied to the inverter and also the rate of change of the frequency of the timing signals.

In accordance with one aspect of the present invention, the variable DC power supply includes a transformer having an output from a secondary winding which is rectified and filtered to provide the DC voltage to the inverter. The transformer includes a magnetic shunt path which separates the transformer core into first and second sections. The magnetic shunt provides a means for limiting the current from the secondary winding to a predetermined value. This current limiting feature of the DC power supply prevents the damage to the inverter's switching elements that is possible on prior art systems which use slow acting fuses and circuit breakers.

Another feature of the DC power supply is the provision of a capacitive reactance coupled across a winding on the second section of the transformer. This provides a means for maintaining the flux in the secondary section of the core near saturation. Accordingly, the resulting wave shape in the secondary winding is substantially a square wave which when rectified results in a DC voltage having a low ripple content.

Yet another feature of the DC power supply is the means employed for varying the output voltage of the transformer secondary. A voltage control current flowing through a pair of control windings on the second section of the transformer will vary the amount of flux which couples the primary and secondary windings, thus controlling the magnitude of the secondary output.

In accordance with another aspect of the present invention, a simple solid-state ring counter comprising three binary elements and counting logic is provided. The ring counter divides the output frequency of the VCO by six, generating a three-phase output to the inverter. Each phase of the output from the ring counter is associated with a particular binary element and comprises two complimentary signals. The direction of phase rotation of the ring counter output signals can be reversed by a change in the counting logic. Two direction control signals control the counting logic and therefore determine the direction of phase rotation of the ring counter output. This particular feature of the inverter eliminates the unreliable switching relays used in the prior art systems.

In accordance with yet another aspect of the present invention, the solid-state static inverter includes three pairs of silicon controlled rectifiers (SCRs) connected in parallel between the DC voltage supplied by the DC power supply and ground. The complementary signals of a particular phase of the three-phase timing signals generated by the ring counter are transformer coupled to the gate electrodes of a particular pair of SCRs. The SCRs of each pair will become conductive alternately in response to the complementary output signals of the ring counter. The timing signals are also transformer coupled to commutation capacitors associated with each SCR. At the same time that the timing signals for a particular phase are causing an SCR to become conductive, they are also charging the associated commutation capacitor. The commutation capacitor will subsequently be coupled across the SCR to cause it to become nonconductive.

DESCRIPTION OF THE PREFERRED EMBODIMENT

Figure 1:
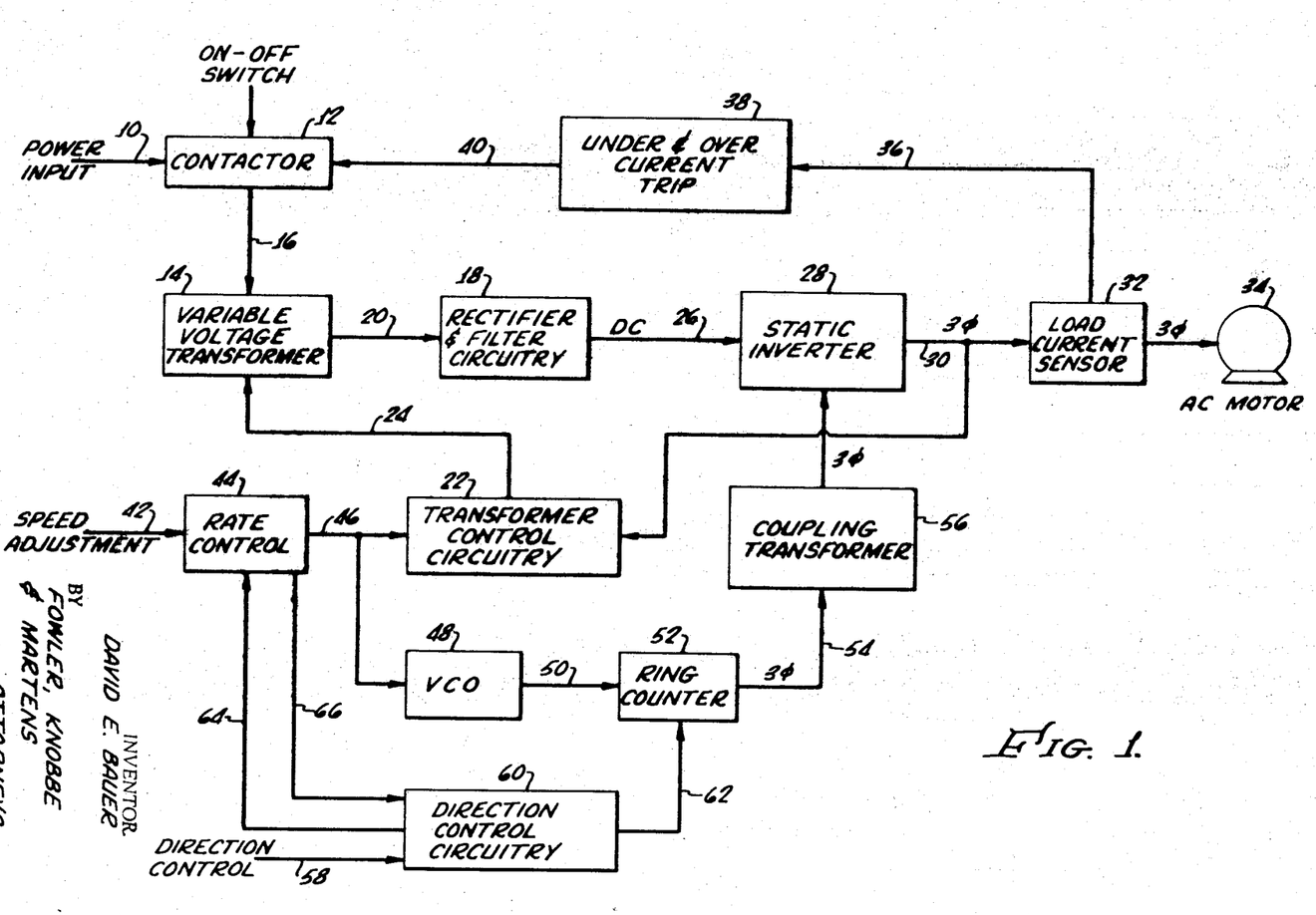
FIG. 1 is a system block diagram of the preferred embodiment of the present invention.

Referring now to FIG. 1, there is shown a system diagram of the preferred embodiment of the present invention. The power input to the system appears on line 10 which is connected to a contactor 12. An on-off switch controls the contactor 12 and will cause the contactor 12 to apply the input power to a variable voltage transformer 14 when actuated. The transformer 14 supplies an alternating voltage to rectifier and filter circuit 18 on line 20. The voltage output of transformer 14 is controlled by transformer control circuitry 22 which generates an output connected to the transformer 14 by line 24. The rectifier and filter circuit 18 converts the AC voltage on line 20 to a DC voltage and applies it to a static inverter 28 by line 26. The inverter 28 generates a three-phase alternating voltage output having a magnitude equal to the magnitude of the voltage appearing on line 26. The three-phase output of inverter 28, for the sake of simplicity, is diagrammatically shown as being connected by a single line 30 through a load current sensor 32 to an AC motor 34. The load current sensor 32 is responsive to the current being supplied to the motor 34 and will generate a signal on line 36 to an under and over current trip 38 proportional to the current. The under and over current trip 38 will deactuate the contactor 12 when the signal on line 36 is not within predetermined limits. When the contactor 12 is deactuated, the power input to the transformer 14 will be removed and the system will be shut down.

The frequency of the voltage output from inverter 28 is controlled by a speed adjustment voltage input to the system on line 42. The signal on line 42 is connected to a rate control circuit 44 which generates an output on line 46 to the transformer control circuitry 22 and a voltage controlled oscillator (VCO) 48. The signal on line 46 is proportional to the signal appearing on line 42 and follows an adjustment of the voltage on line 42 from one level to another at a predetermined rate.

The VCO 48 generates a periodic output on line 50 having a frequency proportional to the magnitude of the voltage appearing on line 46. The periodic signal on line 50 is connected to a ring counter 52. The ring counter 52 cycles at frequency determined by the frequency of the signal on line 50 and produces three-phase timing signals which are represented by line 54. The three-phase timing signals are coupled to the inverter 28 through coupling transformers 56.

The output voltages of the static inverter 28 is fed back as an input to the transformer control circuitry 22. The control circuitry 22 compares the magnitude of the voltage generated by inverter 28 with the magnitude of the signal on line 46 and generates a control signal on line 24 to the variable voltage transformer 14. The transformer control circuitry 22 controls the magnitude of the voltage appearing on line 20 from the variable voltage transformer 14 so that the output of the inverter 28 is proportional to the magnitude of the voltage on line 46.

A direction control signal on lines 58 is an input to a direction control circuitry means 60. The direction control means 60 generates a signal on line 62 to the ring counter 52 to control the direction of the phase rotation of the three-phase timing signals on line 54. The direction control means 60 will reverse the direction of rotation of the motor 34 when the direction control signal on line 58 changes by generating a signal on line 64 to the rate control circuitry 44. The rate control circuitry 44 will respond to the signal on line 64 by reducing the signal on line 46 to 0 volts at a predetermined rate. As the voltage on line 46 is reduced to 0, the VCO 48 will lower the frequency of its output signal on line 50 at a rate proportional to the rate of decrease of the signal on line 46. At the same time, the transformer control circuitry 22 will cause the magnitude of the DC voltage output from the rectifier and filter circuit 18 to be reduced proportionally. The speed of the motor 34, therefore, will be reduced to 0. When the signal on line 46 has reached 0 volts, the rate control circuit 44 will generate an output on line 66 to the direction control means 60. The direction control means 60 will respond to the signal on line 66 and will reverse the phase rotation of the ring counter 52 by generating an appropriate signal on line 62. The rate control means 44 will increase the voltage on the line 46 at a predetermined rate to increase the output frequency of the VCO 48 and the output voltage from the variable voltage transformer 14 to bring the motor 34 back up to its original speed but with an opposite direction of rotation.

Figures 2, 3:
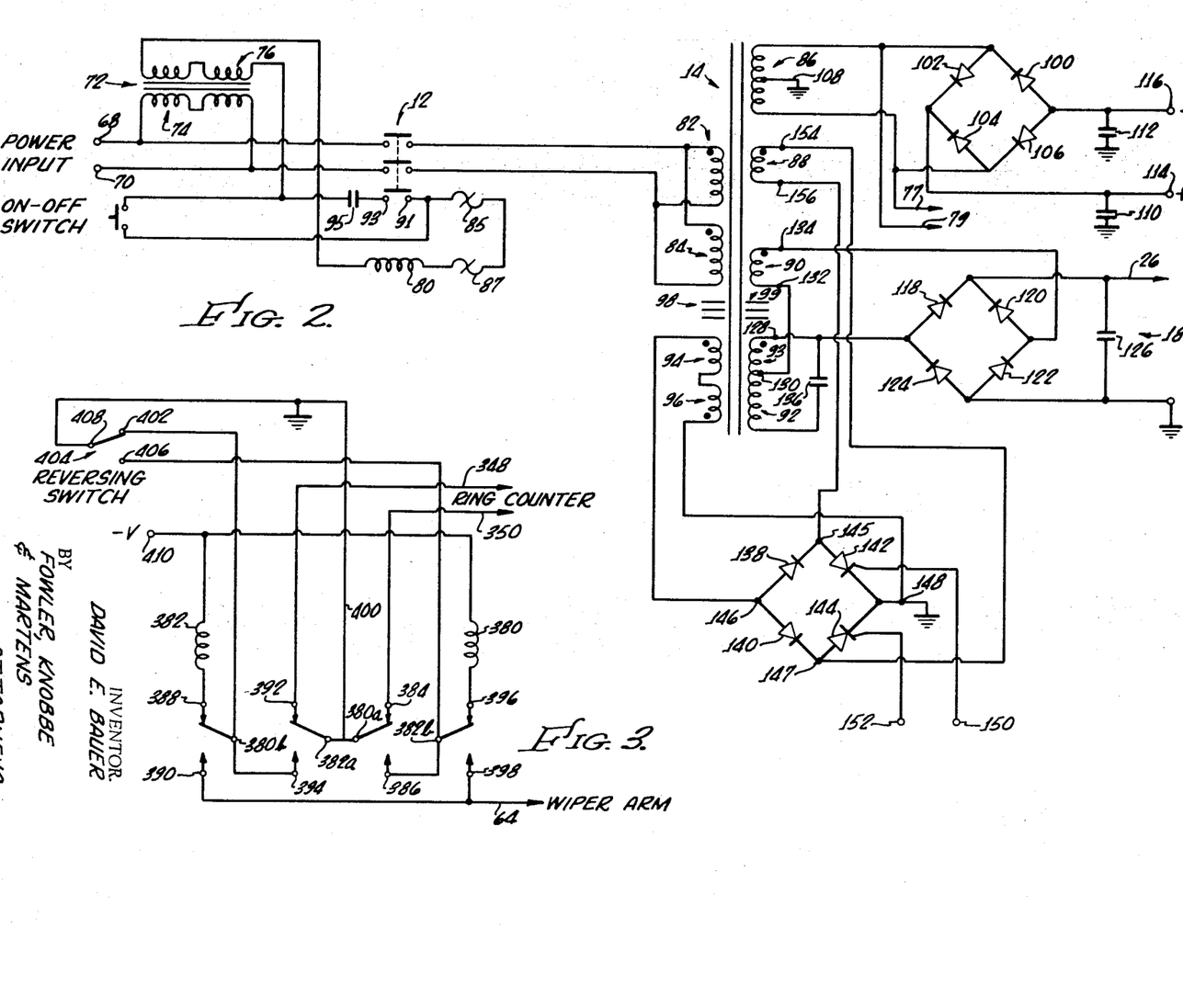
FIG. 2 is a schematic diagram of a variable DC power supply.
FIG. 3 is a schematic diagram of the direction control circuitry.

In FIG. 2 there is shown a schematic diagram of the contactor 12, the variable voltage transformer 14, and the rectifier and filter circuit 18.

The power input to the system is connected to terminals 68 and 70. A transformer 72 is shown having a primary winding 74 and a secondary winding 76. The primary winding 72 is connected across the input terminals 68 and 70. The secondary winding 76 is connected in series with an on-off switch 78, a contactor coil 80, and current overload sensors 85 and 87. The coil 80 is the coil for the contactor 12. Once power has been applied to the terminals 68 and 70, depression of the switch 78 will result in actuation of the contactor 12. When the contactor 12 is actuated, the power input on terminals 68 and 70 will be connected to a pair of primary windings 82 and 84 on the variable voltage transformer 14.

The current overload sensors 85 and 87 are responsive to the current flowing from the input terminals 68 and 70, respectively, to the primary windings 82 and 84. If this current exceeds a predetermined value, these sensors will open to prevent current from flowing through the coil 80 and cause the contactor 12 to deactuate, removing the input power from the transformer 14.

The contactor 12 includes contactor terminals 91 and 93 which will be connected together when the contactor 12 is actuated. A relay contactor 95 is series connected with the terminals 91 and 93. The relay contact 95 is controlled by the under and over current trip 38 seen in FIG. 1 and will be closed at all times after the system has been started so long as the output current from the static inverter 28 to the motor 34 is within predetermined limits. The series connected relay contact 95 and contactor terminals 91 and 93 are connected in parallel with the on-off switch 78. Once the contactor 12 has been actuated by depression of the switch 78 and the input power applied to the transformer 14, the relay contact 95 will actuate and latch the voltage appearing on the secondary winding 76 across the contactor coil 80.

The transformer 14 is basically a modified constant voltage transformer. Constant voltage transformers are well known in the art and usually take a form of the transformer disclosed in the Joseph G. Sola Pat. No. 2,143,745 dated Jan. 10, 1939.

The transformer 14 is magnetically divided into first and second sections by magnetic shunts 98 and 99. The first section includes primary windings 82 and 84 and secondary windings 86, 88 and 90. The second magnetic section of the transformer 14 includes windings 92, 94 and 96.

Figure 7:
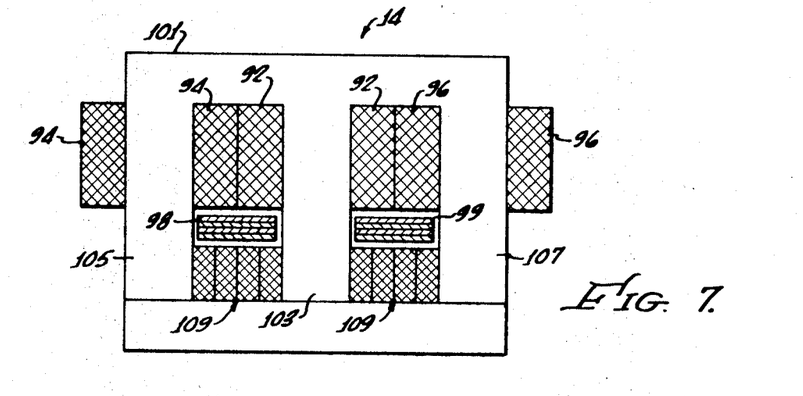
FIG. 7 is a plan view partially in section of a transformer in the variable DC power supply.

Referring to FIG. 7, there is shown a plan view, partially in section, of the transformer 14. The transformer 14 has a standard EI laminated core 101 with a center leg 103 and two outer legs 105 and 107. The magnetic shunts 98 and 99 are disposed between the center leg 103 and the outer legs 105 and 107, as shown. In the FIG., the portion of the transformer 14 below the magnetic shunts 98 and 99 is the first section and the portion above the shunts is the second section. The windings 82, 84, 86, 88 and 90 are not individually shown in the FIG. but are, instead, represented by a single winding bundle 109 which is wound around the center leg 103. The winding 92 is on the center leg 103 above the magnetic shunts 98 and 99. The windings 94 and 96 are wound around the outer legs 105 and 107, respectively, also above the magnetic shunts 98 and 99.

Referring again to FIG. 2, the first section of the transformer 14 operates as a standard transformer. That is, when a voltage is applied to the primary windings 82 and 84, voltages will be induced into the secondary windings 86, 88 and 90 according to their respective turns ratio.

The positive and negative DC voltage potentials referred to hereinafter appear at terminals 114 and 116, respectively. The secondary winding 86 has a center tap 108 which is connected to ground. The voltage appearing across the winding 86 is applied to a full wave bridge rectifier including diodes 100, 102, 104 and 106. A filter capacitor 112 is connected between the diodes 100 and 106 and ground and will be charged negative by the winding 86. The voltage appearing at the terminal 116 is the voltage across the capacitor 112. A filter capacitor 110 is connected between the diodes 102 and 104 and ground and will be charged positive by the winding 86. The positive voltage potential appearing at the terminal 114 is the voltage appearing across the capacitor 110.

A capacitor 136 is connected in parallel with the winding 92. The winding 92 and the capacitor 136 form a ferro-resonant circuit wherein the capacitor 136 is charged and discharged at a frequency determined by the frequency of the voltage applied to the primary windings 82 and 84.

The alternating current in the ferro-resonant circuit will produce a flux density in the second section of the transformer 14 (i.e., the center leg 103) which will add to the flux density in the second section produced by the primary windings 82 and 84 causing the second section to be near saturation at all times. Accordingly, the voltage appearing across the winding 92 will be substantially independent of any variation appearing in the voltage applied to the primary windings 82 and 84 and will have a waveform approximating a square wave.

A portion of the winding 92 appearing between terminals 128 and 130 and hereinafter referred to as winding 93 is connected in series with the winding 90. The voltage appearing in winding 90 opposes the voltage in winding 93 and has a magnitude of approximately 10 percent of the voltage in the winding 93. The series connected windings 90 and 93 provides the voltage appearing across the winding 93 with additional isolation from variations in the voltage appearing on the primary windings 82 and 84.

The net voltage appearing across the series connected winding 93 and winding 90 is applied to a full-wave rectifying bridge including diodes 118, 120, 122 and 124. The bridge rectifier has a filter capacitor 126 connected across its output. The full-wave rectified square wave output from the bridge rectifier is filtered by the capacitor 126 to provide a DC voltage output on line 26. The voltage appearing on line 26 is an input to the static inverter 28. The size of the capacitor 126 may be smaller than the capacitors which normally filter a full-wave rectified sine wave since the output from the bridge rectifier is substantially a full-wave rectified square wave.

The magnitude of the voltage induced in the winding 92 may be varied by a control current passing through the control windings 94 and 96. The control windings 94 and 96 are wound on the legs 105 and 107 of the core 101 and are connected in series opposing each other. The control current regulates the amount of flux produced by the primary windings 82 and 84 which may link the winding 92. As the control current increases, the reluctance of the second section of the core 101 increases and a portion of the primary flux will pass through the magnetic shunts 98 and 99 decreasing the voltage induced into the winding 92.

The load current on line 26 supplied by the winding 92 to the static inverter 28 will be limited to a predetermined value by the transformer 14. As the load current increases, the current in the ferro-resonant circuit will change phase so that the flux produced in the second section of the transformer 14 begins to oppose the flux produced as a result of the voltages in the primary windings 82 and 84 instead of aiding that flux. Accordingly, the reluctance of the second section will increase. The reluctance of the magnetic shunts 98 and 99 is chosen so that when the load current on line 26 approaches the predetermined value, the flux produced by the primary windings 82 and 84 will pass through the shunts 98 and 99 rather than through the second section of the transformer 14. If the load current increases beyond the predetermined value, sufficient flux will pass through the magnetic shunts 98 to cause the load current to be decreased until the reluctance of the second section of the transformer 14 has been reduced to approximately the same value as the reluctance of the magnetic shunts 98 and 99.

The control current passing through the control windings 94 and 96 is regulated by a rectifying bridge including diodes 138 and 140 and silicon controlled rectifiers 142 and 144. The voltage appearing across the winding 88 is applied to the bridge rectifier at points 145 and 147. The series connected windings 94 and 96 are connected to the bridge rectifier at points 146 and 148. The point 148 is also connected to ground. The gate electrodes of the silicon controlled rectifiers 142 and 144 are connected to terminals 150 and 152, respectively. If a positive voltage potential is applied to the terminals 150 and 152 continuously, the voltage appearing on the winding 88 will be full-wave rectified and applied to the control windings 94 and 96. For example, assuming a positive voltage potential has been applied to the terminals 150 and 152 and that the terminal 154 on the winding 88 is positive, the silicon controlled rectifier 144 will be conductive to connect the terminal 154 to ground at point 148. Accordingly, the terminal 156 on winding 88 will be negative with respect to the terminal 154. Current will flow from ground, point 148, through the control windings 96 and 94 and diode 138 to terminal 156 on winding 88. During the second half of the voltage cycle across winding 88, terminal 156 will be positive with respect to terminal 154. The terminal 156 will be connected to ground through silicon controlled rectifier 142. Current will flow from ground, point 148, through the control windings 96 and 94 and diode 140 to the terminal 154.

Although the current applied to the control windings 94 and 96 is not a pure DC current and in fact is a result of a full-wave rectified signal, the effect in the windings 94 and 96 is substantially the same.

The effective current passing through the control windings 94 and 96 will be a maximum when positive voltage potentials are continuously applied to the terminals 150 and 152. The effective value of current through the windings 94 and 96 may be reduced by applying the positive voltage potentials to the gates 150 and 152 for only a portion of each half cycle of the voltage appearing in winding 88. The voltages appearing on the terminals 150 and 152 are produced as an output from the transformer control circuitry 22 and will be discussed hereinafter.

Figure 4:
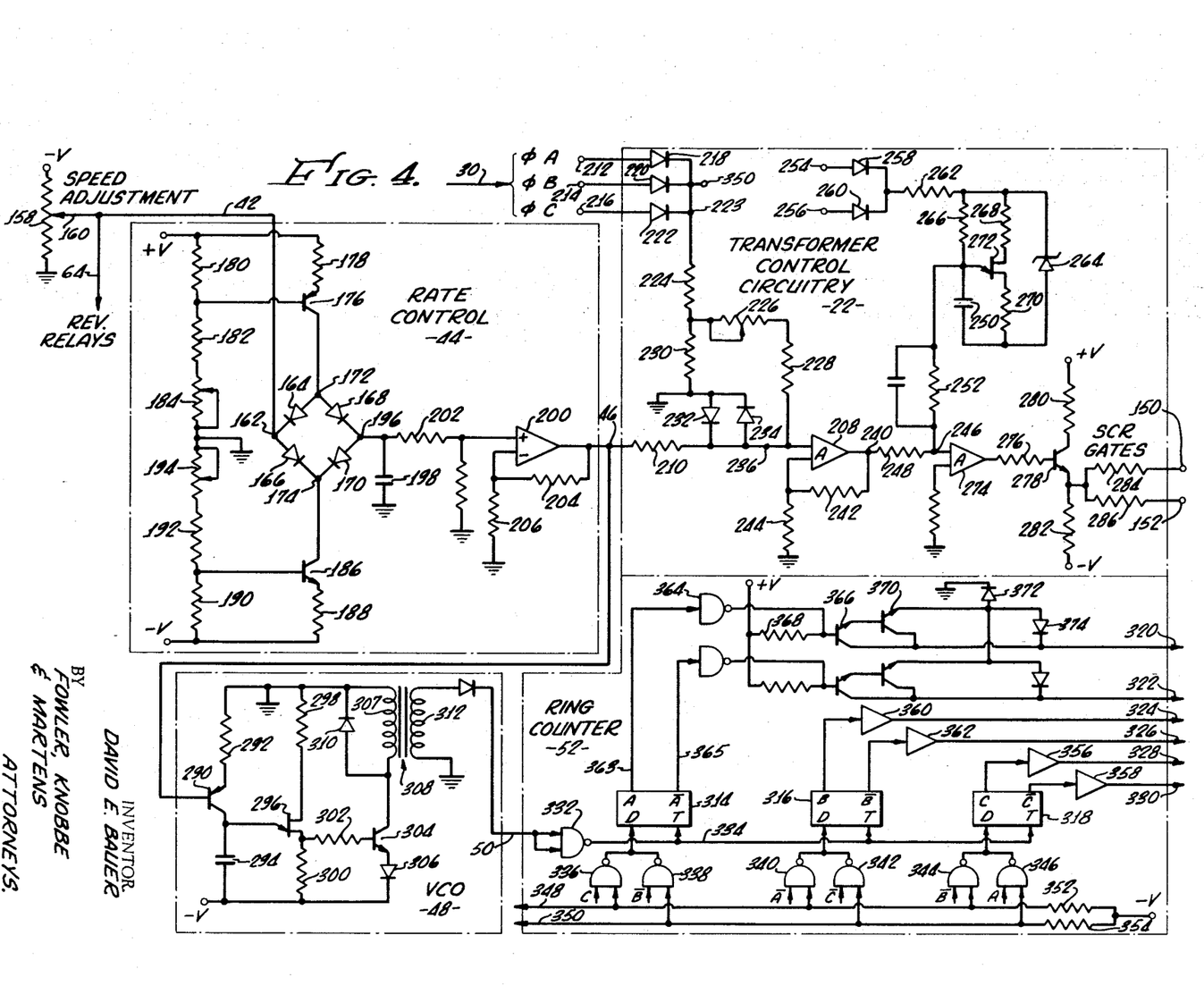
FIG. 4 is a schematic diagram showing the details of a portion of the circuitry from the system of FIG. 1.

A schematic diagram of the rate control circuitry 44, the transformer control circuitry 22, the voltage controlled oscillator 48, and the ring counter 52 is shown in FIG. 4.

A potentiometer 158 having a wiper arm 160 is connected between ground and a negative voltage potential. The voltage appearing on wiper arm 160 is the speed adjustment signal and is connected to the system on line 42. The line 42 is connected to a terminal 162 of a voltage balancing bridge including diodes 164, 166, 168 and 170.

A first constant current source supplies a constant current to a terminal 172 of the voltage balancing bridge. A transistor 176 has its collector connected to the terminal 172 and its emitter connected through a resistor 178 to a positive voltage potential. A resistor 180 is connected between the positive voltage potential and the base of the transistor 176. The base of the transistor 176 is connected to ground through a series connected fixed resistor 182 and adjustable resistor 184. An adjustment of the resistor 184 will vary the amount of current supplied through the transistor 176 to the bridge terminal 172.

A second constant current source will receive current from a terminal 174 of the voltage balancing bridge. A transistor 186 has its collector connected to the terminal 174 and its emitter connected through a resistor 188 to a negative voltage potential. A resistor 190 is connected between the negative voltage potential and the base of the transistor 186. The base of the transistor 186 is connected to ground through a series connected fixed resistor 192 and adjustable resistor 194. Adjustment of the resistor 194 will vary the amount of current which may be conducted by the transistor 186.

A capacitor 198 is connected between a terminal 196 of the voltage balancing bridge and ground. If the voltage potential on the terminal 162 is the same as the voltage potential on the terminal 196, (i.e., the voltage across the capacitor 198), the current flowing into the terminal 172 from the first constant current source will be evenly divided between a first current path including diodes 164 and 166 and a second current path including diodes 168 and 170. If the voltage on terminal 162, however, is increased due to an adjustment of the potentiometer 158, the current through the first path will be decreased and more current will be conducted through the diode 168 to the terminal 196 to charge the capacitor 198. Once the capacitor 198 has been charged to the same voltage potential appearing on terminal 162 by this increased current flow, the voltage bridge will be balanced and the current will again be evenly divided between the two current paths.

If the voltage at the terminal 162 is decreased resulting in the potential at terminal 196 being higher than the potential of the terminal 162, the capacitor 198 will discharge through the diode 170 into the second current source until the voltage at terminal 196 is equal to the voltage on the terminal 162.

The rate at which the capacitor 198 will be charged to the same voltage potential as that appearing at the terminal 162 is determined by the size of the capacitor 198 and the output impedance of the first constant current source. The output impedance of the first constant current source is varied by an adjustment of the adjustable resistor 184.

The rate at which the charge on the capacitor 198 will be discharged when the potential at the terminal 162 has been lowered is determined by the size of the capacitor 198 and the input impedance of the second constant current source. The input impedance of the second constant current source is varied by an adjustment of the adjustable resistor 194.

Accordingly, when the spaced adjustment signal input to the system at terminal 162 increases, the voltage across capacitor 198 will follow that increase at a first predetermined rate and when the signal at terminal 162 decreases, the voltage across the capacitor 198 will decrease at a second predetermined rate.

The voltage appearing across the capacitor 198 is connected to the noninverting input of an operational amplifier 200 through a resistor 202. The operational amplifier 200 generates an output on line 46 to the transformer control circuitry 22 and also to the voltage controlled oscillator 48. The gain of the operational amplifier 200 is determined by resistors 204 and 206. Advantageously, the gain of the operational amplifier 200 is unity so that the signal appearing on line 46 follows the voltage appearing across the capacitor 198 which may vary from 0 to −4 volts. The input impedance of the operational amplifier 200 is extremely high so that the voltage across the capacitor 198 will be unaffected.

The signal on line 46 from the rate control means 44 is connected through a resistor 210 to a summing junction 236 in the transformer control circuitry 22. The three-phase output from the static inverter 28 shown in FIG. 1 as appearing on line 30 is also an input to the transformer control circuitry 22. The phases A, B and C are connected to terminals 212, 214 and 216, respectively, on the transformer control circuitry 22. The signals appearing on these terminals are rectified by diodes 218, 220 and 222, respectively, and are applied to a node point 223. The rectified voltage appearing at node point 223 is connected to the summing junction 236 through series connected resistors 224, 226 and 228. A resistor 230 is connected to ground from a point intermediate the resistors 224 and 226.

The voltage appearing at the summing junction 236 is an input to an operational amplifier 208 and is the sum of the voltages appearing on line 46 and the node point 223. The diode 232 having its cathode connected to the summing junction 236 and its anode connected to ground, clamps the summing junction 236 to approximately −0.8 volts while a diode 234 having its anode connected to the summing junction 236 and its cathode connected to ground, clamps the summing junction 236 to approximately +0.8 volts.

The operational amplifier 208 amplifies the voltage appearing at the summing junction 236 and generates an output on line 240. The magnitude of the voltage output from the operational amplifier 208 may vary between 0 volts and −10 volts. The gain of the operational amplifier 208 is in the order of 10 to 15, as determined by resistors 242 and 244.

The output from the operational amplifier 208 is connected to a summing junction 246 by a resistor 248.

A second input to the summing junction 246 is a sawtooth waveform which appears across a capacitor 250 and which is coupled to the summing junction 246 through a resistor 252. The sawtooth waveform from the capacitor 250 has a frequency equal to the frequency of the input voltage applied to the system.

Figure 8:
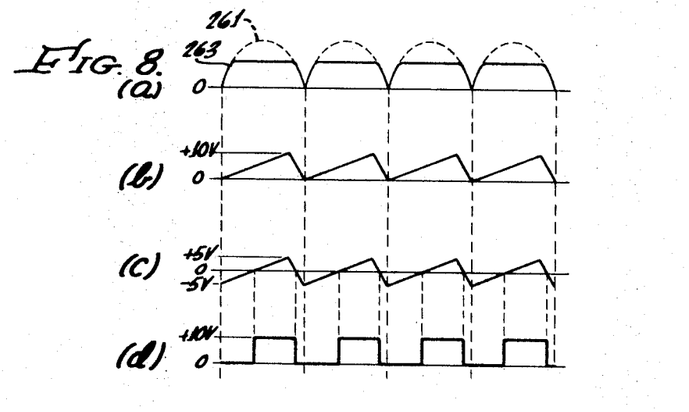
FIG. 8 is a graphical representation of voltages appearing at particular points in the schematic diagram of FIG. 4.

The voltage appearing across the secondary winding 86, seen in FIG. 2, is connected to terminals 254 and 256 by lines 77 and 79, respectively. The voltages appearing at the terminals 254 and 256 are rectified and applied to a node point 257 by diodes 258 and 260, respectively. The full-wave rectified signal appearing at the node point 257 is shown in FIG. 8 (a) by a dotted waveform 261. The signal at node point 257 is connected through a resistor 262 to the cathode of a zener diode 264. The zener diode 264 will clip the full-wave rectified voltage appearing across it as shown in FIG. 8 (a) by a waveform 263. The capacitor 250 and a series connected resistor 266 are connected in parallel with the zener diode 264. The gate of a unijunction transistor 272 is connected intermediate the resistor 266 and the capacitor 250. A resistor 268 is connected to the source of the unijunction transistor 272 and a resistor 270 is connected to the drain. The series connected resistor 268, unijunction transistor 272 and resistor 270 are also connected in parallel to the zener diode 264.

The capacitor 250 will be charged through the resistor 266 by the clipped full-wave rectified signal appearing across the zener diode 264. When the voltage potential across the capacitor 250 reaches a predetermined value, 10 volts for example, the unijunction transistor 272 will become conductive to discharge the capacitor 250 through the resistor 270 to ground. The values of the resistor 266 and the capacitor 250 are chosen so that the RC time constant is greater than approximately 8 milliseconds. This will result in the capacitor 250 charging linearly until the unijunction transistor 272 discharges the capacitor. Accordingly, the voltage wave shape across the capacitor 250 is a sawtooth as seen in FIG. 8(b).

The unijunction transistor 272 will become nonconductive to allow the capacitor 250 to charge when the clipped full-wave rectified voltage appearing across the zener 264 decreases to 0 volts as shown in FIGS. 8 (a) and 8 (b).

The voltage output from the operational amplifier 208 will have a maximum value of −10 volts while the sawtooth waveform across the capacitor 250 will have a maximum amplitude of +10 volts. Accordingly, if the output from the amplifier 208 is at maximum the summed voltage at the summing junction 246 will always be negative. If the output of the amplifier 208 is 0 volts, the voltage appearing at the summing junction 246 will simply be the sawtooth waveform across the capacitor 250 and, accordingly, will have a magnitude of +10 volts. In a like manner, if the output from the amplifier 208 is −5 volts, the voltage at the summing junction will vary between −5 volts and +5 volts as shown in FIG. 8(c).

The voltage appearing at the summing junction 246 is an input to an operational amplifier 274. The operational amplifier 274 has an extremely high gain and will generate a maximum output voltage when the voltage at the summing junction 246 is only slightly positive. Accordingly, the output of the operational amplifier 274 will be a pulse train wherein the pulses have a width determined by the period of time that the sawtooth wave shape appearing a the summing junction 246 is positive as shown by the waveform in FIG. 8(d).

It will be observed that if the output from the operational amplifier 208 into the summing junction 246 were to become less negative, the voltage at the summing junction 246 would have a longer period of time during which it would be positive. Therefore, the pulse generated by the amplifier 274 would have a longer duration. Assuming the operational amplifier 208 had a 0 volt output, the sawtooth waveform appearing at the summing junction 246 would always be positive. Accordingly, the output from the operational amplifier 274 would always be maximum, i.e., a DC voltage.

The output from the operational amplifier 274 is connected through a resistor 276 to the base of a transistor 278. The collector of the transistor 278 is connected to a positive voltage potential through a resistor 280. The emitter of the transistor 278 is connected to a negative voltage potential through a resistor 282. The emitter of the transistor 278 is also connected to the terminals 150 and 152, seen in FIG. 2, through resistors 284 and 286, respectively.

The transistor 278 will become conductive when the operational amplifier 274 generates a positive output. When the transistor 278 is conductive, the resistors 280 and 282 form a voltage dividing network which results in the emitter of the transistor 272 becoming positive. Accordingly, a positive pulse is applied to the terminals 150 and 152 through the resistors 284 and 286. The emitter of the transistor 278 will be negative when the operational amplifier 274 does not generate an output.

To illustrate the operation of the rate control means 44 and the transformer control circuitry 22, assume that the wiper arm 160 is moved up the potentiometer 158 so that the voltage appearing on line 42 increases negatively. The operational amplifier 200 will follow the change in the voltage on the line 42 at a predetermined rate and will become more negative. The increased negative voltage on the line 46 will result in the voltage at the summing junction 236 becoming negative. The operational amplifier 208 will generate a negative output to the summing junction 246. The negative input to the summing junction 246 when summed with the sawtoothed voltage appearing across the capacitor 250 will result in the voltage at the summing junction 246 being positive for a shorter period of time during each cycle of the sawtoothed waveform input. Accordingly, the pulses generated by the operational amplifier 274 will have a shorter duration causing the positive pulses applied to the terminals 150 and 152 to have shorter durations. When the pulses at the terminals 150 and 152 have shorter durations, the effective control current through the control windings 94 and 96 seen in FIG. 2 will be decreased causing the output voltage on the winding 92 to increase due to the increased flux coupling the winding 92 from the primary windings 84 and 86. An increased negative voltage on the line 42, then, will result in a smaller effective control current in the control windings 94 and 96 allowing the DC voltage generated by the variable voltage transformer 14 to be increased. As the voltage output from the static inverter 28 increases due to the increased DC voltage output from the transformer 14, the voltage at the node point 223 will increase to null out the voltage unbalance at the summing junction 236.

Conversely, if the wiper arm 160 is moved toward ground potential decreasing the negative voltage appearing on the line 42, the pulses applied to the terminals 150 and 152 will have a longer duration causing the control current in the control windings 94 and 96 to be increased thereby reducing the voltage generated by the winding 92.

The voltage appearing on the line 46 is also an input to the voltage controlled oscillator 48. The line 46 is connected to the base of a transistor 290. The emitter of the transistor 290 is connected through a resistor 292 to ground. A capacitor 294 is connected between a negative voltage potential and the collector of the transistor 290. The voltage potential on the line 46 determines the conductivity of the transistor 290. The more negative the voltage on line 46, the more conductive the transistor 290 will be. The current flowing through the transistor 290 will charge the capacitor 294.

The collector of the transistor 290 is connected to the gate of a unijunction transistor 296. The source of the unijunction transistor 296 is connected through a resistor 298 to ground and the drain is connected through a resistor 300 to a negative voltage potential. When the voltage on the capacitor 294 has increased to a predetermined level, the unijunction transistor 296 will become conductive to discharge the capacitor 294 through the resistor 300.

A resistor 302 is connected between the drain of the unijunction transistor 296 and the base of a transistor 304. A diode 306 is connected between the emitter of the transistor 304 and the negative voltage potential. The collector of transistor 304 is series connected with a primary winding 307 of a pulse transformer 308 to ground. The transformer 304 will be nonconductive until the unijunction transistor 296 discharges the capacitor 294. As the capacitor 294 is discharging through the resistor 300, the potential on the base of the transistor 304 will increase, causing the transistor to become conductive. Each time the transistor 304 becomes conductive, a pulse of current will pass through the primary winding 307 causing a voltage to be induced into a secondary winding 312. The voltage appearing in the winding 312 is the output of the VCO 48 and will appear on the line 50 as an input to the ring counter 52.

The frequency of the pulses appearing on the line 50 from the VCO 48, accordingly, is a function of the magnitude of the voltage appearing on the line 46. As the voltage on the line 46 becomes more negative, the capacitor 294 will be charged more quickly resulting in a higher frequency output on the line 50. As the position of the wiper arm 160 is changed changing the magnitude of the signal input on the line 42, the signal on the line 46 will follow that adjustment at a predetermined rate. Accordingly, the rate of change of the frequency on the line 50 will occur at that predetermined rate.

The ring counter 52 is solid-state device including three flip-flops 314, 316 and 318. The ring counter 52 will divide the frequency of the pulses appearing on the line 50 by six and generate timing signal outputs on lines 320 through 330 to the static inverter 28. The signals on the lines 320 through 330 are three-phase with each phase comprising a pair of complementary signals. The signals on the lines 320 and 322 are the complementary signals generated by the flip-flop 314 and comprise the phase A complementary signals. The signals appearing on the lines 324 and 326 are generated by the flip-flop 316 and are the complementary timing signals of phase B. The signals appearing on the lines 328 and 330 are generated by the flip-flop 318 and are the complementary timing signals of phase C.

The flip-flops 314, 316 and 318 are interconnected to divide the frequency of the pulses appearing on the line 50 by six. The pulses appearing on the line 50 are an input to a NAND gate 332. The gate 332 will generate an output on line 334 to the flip-flops of the ring counter 52 each time a pulse appears on the line 50. Each of the flip-flops 314, 316 and 318 has a pair of NAND gates associated with it. NAND gates 336 and 338 are associated with the flip-flop 314. NAND gates 340 and 342 are associated with the flip-flop 316 and the flip-flop 318 has NAND gates 344 and 346 with it. The NAND gates 336 through 346 determine the counting logic of the flip-flops 314, 316 and 31. If the gates 336, 340 and 344 are enabled, the flip-flops in the ring counter 52 will count in one direction, i.e., it will have a particular phase rotation. If, however, the gates 338, 342 and 346 are enabled, the flip-flops will count in the opposite direction, that is they will have the opposite phase rotation to the previous phase rotation. An input to the ring counter 52 on a line 348 is connected through a resistor 352 to a negative voltage potential. The line 348 is an input to the logic gates 336, 340 and 344. A second input to the ring counter 52 appears on line 350. The line 350 is connected to the negative voltage potential through a resistor 354. The signal on line 350 is an input to the logic gates 338, 342 and 346. The signals appearing on the lines 348 and 350 are represented in FIG. 1 by the single line 62 as an input to the ring counter 52.

The lines 348 and 350 are complementary to each other and will either have no connection and will be floating or will be connected to ground as determined by the direction control circuitry 60. If, for example, the line 348 was connected to ground and the line 350 had no connection, the input to the gates 336, 340 and 344 from the line 348 would be at ground potential whereas the inputs to the gates 338, 342 and 346 from the line 350 would have a negative voltage potential. Accordingly, when the line 348 is grounded, the flip-flops in the ring counter 52 would count in a first direction or phase rotation. If the line 350 was grounded and the line 348 had no connection, however, the flip-flops in the ring counter 52 would count in the opposite direction or phase rotation.

The complementary outputs from each of the flip-flops in the ring counter 52 has a power amplifier associated with it. A detailed schematic diagram of one such power amplifier is shown coupling the true output on line 363 from the flip-flop 314 to the output line 320.

The line 363 is an input to a NAND gate 364. The signal on line 363 will have a positive voltage potential when the flip-flop 314 is set or true and will be ground when the flip-flop 314 is reset or false. The gate 364 will invert the signal on line 363 and will apply it to the base of a transistor 366. A resistor 362 is connected between the base of the transistor 366 and a positive voltage potential. The emitter of the transistor 366 is connected to the base of a transistor 370. The emitter of transistor 370 is connected to ground through a diode 372. The collectors of the transistors 366 and 370 are connected together. The voltage potential of the common collector junction of the transistors 366 and 370 is the output potential on the line 320.

Assuming there is no output from the gate 364, the transistors 366 and 370 will be conductive, clamping the line 320 to ground potential. If the signal on line 363 were a positive voltage potential, however, the gate 364 would generate a negative output to the base of transistor 366. The transistors 366 and 370 would become nonconductive to remove the ground potential from the line 320. As previously described, the signals appearing on the lines 320 and 322 are complementary. Accordingly, when the line 320 is at ground potential, the line 322 will not be connected to ground. Conversely, when the line 320 is not connected to ground, the line 322 will be at ground potential.

A pair of power amplifiers 360 and 362 are associated with the true and false outputs from the flip-flop 316. A second pair of power amplifiers 356 and 358 are associated with the true and false outputs, respectively, from the flip-flop 318. The power amplifiers 356, 358, 360 and 362 are each identical to the power amplifier described in association with the true output on line 363 from the flip-flop 314.

Referring now to FIG. 3, there is shown a schematic diagram of the direction control means 60 seen in FIG. 1. The direction control means 60 includes a pair of double-pole double-throw relays 380 and 382 which are shown in the FIG. normally closed. The two poles for the relay 380 are designated in the FIG. as 380a and 380b. In a similar fashion, the two poles for the relay 382 are designated 382a and 382b. In the normally closed position, the poles 380a and 380b are connected to terminals 384 and 388, respectively. When the relay 380 is actuated, the poles 380a and 380b are connected to terminals 386 and 390, respectively. In the normally closed position, the poles 382a and 382b are connected to terminals 392 and 396, respectively. When the relay 382 is actuated, the poles 382a and 382b are connected to terminals 394 and 398, respectively. The poles 380a and 382a are connected together and are connected to ground by a line 400. The pole 380b is connected to a terminal 402 on a single-pole double-throw reversing switch 404. The pole 382b is connected to the second terminal 406 on the reversing switch 404. The pole 408 of the reversing switch 404 is connected to ground. The coil for the relay 380 is connected between the terminal 396 and a terminal 410. The coil for the relay 382 is connected between the terminal 388 and the terminal 410. A negative voltage potential generated by the over and under current trip 38 seen in FIG. 1, will appear at the terminal 410 after the system has been turned on, as will be described hereafter.

The terminals 390 and 398 are connected together and are also connected to the wiper arm 160 seen in FIG. 1 by the line 64.

The terminals 392 and 384 are connected by the lines 348 and 350, respectively, to the ring counter 52 seen in FIG. 4. The signals appearing on the lines 348 and 350 determine the direction of phase rotation of the flip-flops in the ring counter 52.

Assuming the reversing switch 404 has its pole 408 connected to the terminal 402, a ground will be placed on the terminal 388 causing the relay 382 to actuate. When the relay 382 is actuated, the pole 382a will be connected to the terminal 394, placing a ground on the terminal 392 and removing the ground from the terminal 392. Accordingly, the relay 382 will be latched and the signal on the line 348 will be floating. The line 350, however, will be at ground potential since the relay 380 is not actuated and the pole 380a is connected to the terminal 384. Also, when the relay 382 is actuated, the pole 382b will be connected to the terminal 398.

The direction control circuitry 60 will remain in this configuration with the signal on line 350 at ground until the pole 408 of the reversing switch 404 is connected to the terminal 406 to reverse the direction of phase rotation of the ring counter 52.

Assuming the pole 408 has been connected to the terminal 406, a ground will be placed on the relay pole 382b which is connected to the terminal 398. The signal on the line 64 to the wiper arm 160 will assume a ground potential. The potential on the line 64 is an input to the rate control means 44 seen in FIG. 4. Accordingly, when the reversing switch 404 is thus positioned, the rate control means 44 will respond by discharging the capacitor 198 to ground potential at a predetermined discharge rate. The voltage on the line 46 from the operational amplifier 200 will decrease to 0 volts at the same predetermined rate. The decrease in the voltage on the line 46 will cause the transformer control circuitry means 22 to reduce the voltage output from the transformer 14 to the inverter 28 to 0 volts. It will also cause the output from the VCO 48 to decrease in frequency to 0 cps. The AC motor 34 will therefore be slowed to 0 r.p.m. at a predetermined rate while maintaining a constant torque output since the voltage and the frequency applied to the motor 34 will be reduced proportionally.

Returning again to FIG. 3, the voltage appearing at the terminal 410 will be present only when the voltage on the line 46 is negative. Recall that when the voltage on line 46 assumes a ground potential, the voltage at terminal 410 will no longer be present. Accordingly, once the signal on the line 46 has reached ground potential, the relay 382 will deactuate, returning the relay poles 382a and 382b to their normally closed positions. Once the pole 382b is connected to the terminal 396, the ground will be removed from the terminal 398 to allow the input on the line 42 to the rate control means 44 to assume the potential of the wiper arm 160. The capacitor 198 will charge to the potential of the line 42 at the predetermined charge rate. The voltage on the line 46 will follow the voltage across the capacitor 198 to cause the transformer control circuitry 22 to increase the DC voltage applied to the static inverter 28 and to increase the output frequency of the VCO 48.

As the voltage on the line 46 increases from ground potential, the negative voltage potential will reappear at the terminal 410. The relay 380, therefore, will become actuated since the terminal 396 is now connected to the relay pole 382b. When the relay 380 actuates, the pole 380b will become connected to the terminal 386. The ground on the pole 380a therefore will latch the relay 380. Since the relay 382 was deactuated and is in the normally closed position, the pole 382a, having a ground potential, is connected to the terminal 392. The line 348, therefore, will be at ground potential while the line 350 is not connected. The phase rotation from the output of the ring counter 52 will now be opposite from what it previously was.

Figure 5:
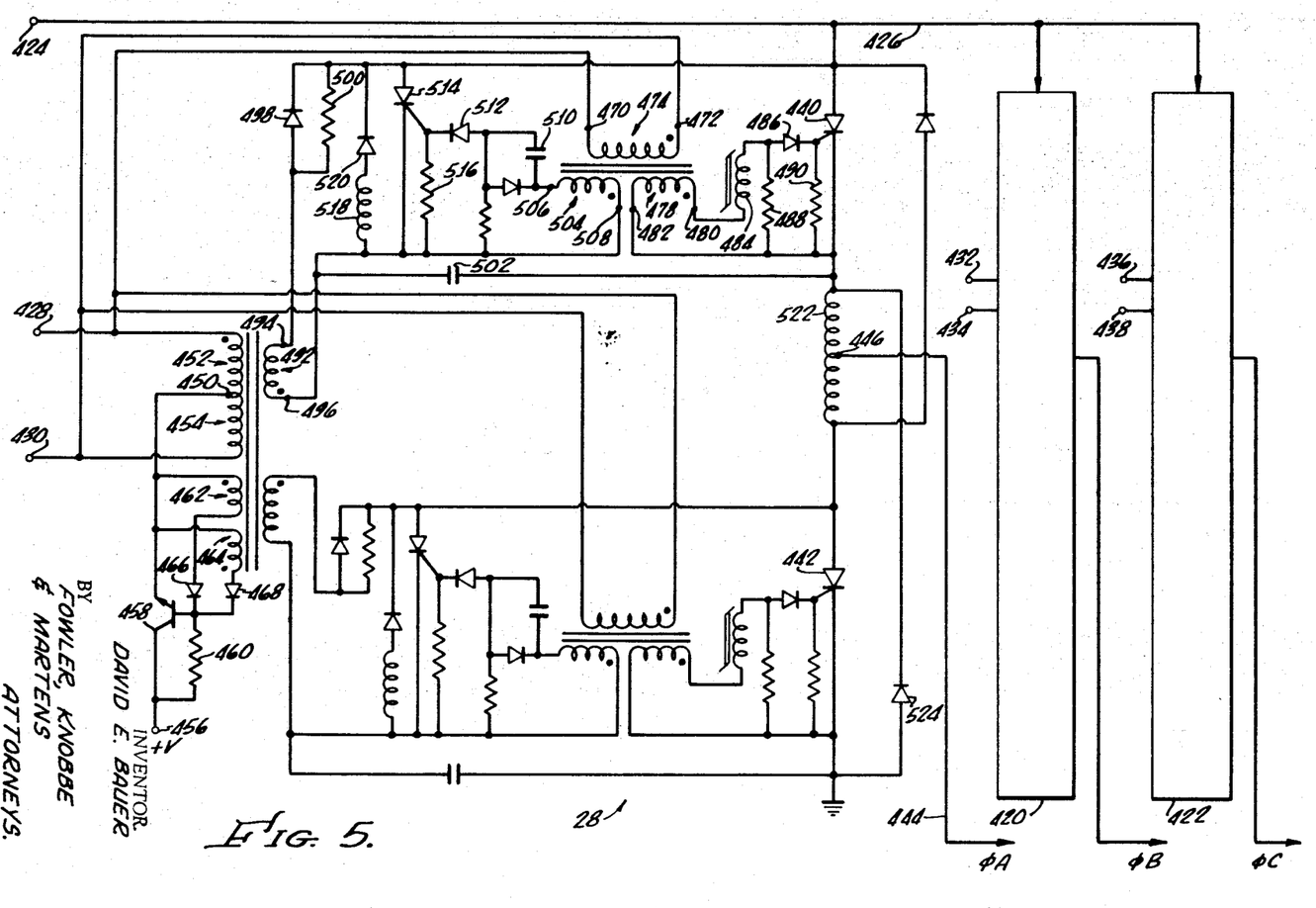
FIG. 5 is a schematic diagram of the static inverter employed in the present invention.

Referring now to FIG. 5, there is shown a schematic diagram of the static inverter 28. The circuitry shown in FIG. 5 is the circuitry for generating phase A of the three-phase output from the static inverter 28. Phase B of the inverter 28 output is generated by a block 420 and phase C is generated by a block 422. The circuitry contained in the blocks 420 and 422 is identical to the circuitry employed to generate phase A.

The DC voltage generated by the rectifier and filter circuit 18 seen in FIG. 1 is connected as an input to the static inverter 28 on a terminal 424. A bus 426 connects the terminal 424 to the circuitry associated with each phase of the static inverter 28 output.

The three-phase timing signals generated by the ring counter 52 seen in FIG. 4 are connected as an input to the static inverter 28. The signals appearing on the lines 320 and 322 in FIG. 4 are connected to terminals 428 and 430 to control the frequency and timing of phase A of the static inverter 28 output. The signals appearing on lines 324 and 326 are connected to terminals 432 and 434 as an input to the block 420 to control the frequency and timing of the phase B output. Phase C of the static inverter 28 output is controlled by the signals appearing on the lines 328 and 330 which are connected to terminals 436 and 438 as an input to the block 422.

A pair of switching silicon controlled rectifiers 440 and 442 are connected in series between the voltage potential appearing on the bus 426 and ground. A line 44 is connected to a point 446 intermediate the SCRs 440 and 442. The signal appearing on the line 444 is phase A of the static inverter 28 output. The complementary timing signals appearing on the terminals 428 and 430 will cause the SCRs 440 and 442 to become alternately conductive. The signal appearing on the line 444 then will be a square wave which will change from a magnitude equal to the voltage appearing on the bus 426 when the SCR 440 is conductive and ground when the SCR 442 is conductive.

The timing signals on the terminals 428 and 430 are connected across the primary winding of a transformer 448. The primary winding of the transformer 448 has a center tap 450 which divides the primary winding into a first winding 452 and a second winding 454. A positive voltage potential appears on a terminal 456 and is connected to the collector of a transistor 458. The emitter of the transistor 458 is connected to the center tap 450. A resistor 460 is connected between the collector and the base of the transistor 458. A secondary winding 462 on the transformer 448 is connected in series with a diode 466 between the emitter and the base of transistor 458. A second secondary winding 464 is connected in series with a diode 468 between the emitter and the base of the transistor 458. The transistor 458 and its associated secondary windings 462 and 464 comprise a current limiting means for limiting the current flowing from the terminal 456 into the center tap 450 of the transformer 448. This current limiting means will be discussed hereinafter.

The signals appearing on the terminals 428 and 430 are complementary and will alternate between ground potential and no potential, as previously discussed, at a frequency determined by the ring counter 52. Assuming that the terminal 428 is at ground potential, the terminal 430 is at no potential and that the transistor 458 is conductive, the voltage potential at the terminal 456 will be placed across the winding 452 causing the potential of the terminal 430 to be positive with respect to the terminal 428 as in an autotransformer. The terminals 428 and 430 are connected to terminals 470 and 472, respectively, of a primary winding 474 on a transformer 476. Accordingly, when the terminal 428 is grounded, the terminal 472 will become positive with respect to the terminal 470 on the transformer 476. The voltage placed across the primary winding 474 will induce a voltage into a secondary winding 478 such that a terminal 480 will be positive with respect to a terminal 482. An iron core saturable inductor 484 is connected in series with a diode 486 between the terminal 480 on the secondary winding 478 and the gate of the switching SCR 440. The terminal 482 is connected to the cathode of the SCR 440. A resistor 488 is connected from the terminal 482 to a point intermediate the saturable inductance 484 and the diode 486. A resistor 490 is connected from the terminal 482 to the gate of the SCR 440. When the positive potential appears at the terminal 480, it will be applied across the saturable inductor 484 and the resistor 488. After a predetermined period of time, the inductor 484 will saturate becoming a short circuit allowing the positive voltage potential at the terminal 480 to be applied through the diode 486 to the gate of the switching SCR 440. The SCR 440 will then become conductive to connect the voltage appearing on the bus 426 to the output line 444.

The terminal 482 on the winding 478 is connected to the cathode of the SCR 440 so that when the voltage is induced into the winding 478 the terminal 480 will be approximately 5 volts higher than the cathode of the SCR 440. This is required in order to turn the SCR 440 on.

A secondary winding 492 on the transformer 448 has a terminal 494 which is connected to the voltage bus 426 through a parallel connected diode 498 and resistor 500. A terminal 496 on the winding 498 is connected to the cathode of the SCR 440 through a commutation capacitor 502. When the terminal 428 assumes a ground potential causing the terminal 430 to become positive with respect to the terminal 428, a voltage will be induced into the secondary winding 492 such that the terminal 494 will be positive with respect to the terminal 496. Since the terminal 494 is coupled to the voltage bus 426 and the SCR 440 has just become conductive, the terminal 496 will have a potential less than the potential of the voltage bus 426 by an amount determined by the voltage induced into the winding 492. Accordingly, the capacitor 502 will become negatively charged with respect to the voltage bus 426 by the amount of voltage induced into the winding 492.

The circuitry described above will remain in this condition for one-half of the cycle of the timing signal inputs to the terminals 428 and 430.

Assuming, now, that the second half cycle of the timing signals applied to the terminals 428 and 430 occurs, the terminal 430 will assume a ground potential and the terminal 428 will have no potential applied to it. The positive voltage potential on the terminal 456 will be placed across the winding 454 causing the terminal 428 to become positive with respect to the terminal 430. The terminal 470 on the winding 474 will therefore be positive with respect to the terminal 472. The voltage applied to the winding 474 will induce a voltage into a secondary winding 504 on the transformer 476. A terminal 506 on the winding 504 will become positive with respect to a terminal 508. A capacitor 510 is connected between the terminal 506 and a diode 512. The diode 512 is connected to the gate of an SCR 514. A resistor 516 is connected between the gate and the cathode of the SCR 514. The cathode of the SCR 515 is connected to the terminal 508 on the winding 504 and also to the terminal 496 on the winding 492. The positive voltage potential appearing at the terminal 506 will be integrated by the capacitor 510 and the resistor 516 so that a voltage pulse will appear across the resistor 516 and a duration sufficiently long to cause the SCR 514 to become conductive. When the SCR 514 becomes conductive, the commutation capacitor 502 is effectively connected in parallel to the switching SCR 440. The anode of the SCR 440, then, will have a voltage potential which is less than the cathode by an amount equal to the voltage potential across the commutation capacitor 502.

To turn a conducting SCR off, the current being conducted through that SCR must be reduced to approximately 0 for a predetermined period of time. The commutation capacitor 502 therefore must divert the current which was previously flowing through the SCR 440 for a period of time sufficient to allow the SCR 440 to regain its blocking state, i.e., become nonconductive. The value of the capacitor 502 is chosen from the equation CV  It. In the equation, V is the voltage that the capacitor is charged to, I is the maximum current which could possibly be flowing through the SCR 440 and is determined by the maximum current capability of the power supply supplying the static inverter 28, and $t$ is the amount of time that the current I must be diverted.

The capacitor 502 will charge to the voltage potential of the voltage bus 426 as it diverts the current which previously was flowing through the SCR 440. When the charge on the capacitor 502 reaches the level of the voltage bus 426, current will no longer flow through the SCR 514 and it will regain its blocking state. At this same time, the terminal 494 on the winding 492 is negative with respect to the terminal 496 and will aid in shutting off the SCR 514.

The circuitry will remain in this status for the second half of the cycle of the timing signals appearing on the terminals 428 and 430.

During the first half-cycle of the next cycle of the timing signals, the terminal 428 will assume a ground potential and the terminal 430 will have no potential applied to it. As previously described, the positive voltage potential at the terminal 456 will be applied across the winding 452 causing the terminal 430 to have a positive potential with respect to the terminal 428. The voltage across the terminals 428 and 430 is applied to the winding 474 on the transformer 476. A voltage will be induced into the winding 478 which after a delay determined by the saturation time required for the inductor 484 will cause the SCR 440 to become conductive.

A series connected inductor 518 and diode 520 is connected in parallel to the SCR 514. When the SCR 440 becomes conductive, the positive charge stored on a capacitor 502 will be discharged through the inductor 518, the diode 520, and the SCR 440 reversing itself upon the capacitor 502. Accordingly, the capacitor 502 will have a negative voltage across it when the winding 492 on the transformer 448 begins to charge it for the next commutation cycle.

As inductor 522 is connected between the cathode of the SCR 440 and the output terminal 446. The inductor 522 will prevent the charge on the capacitor 502 from being sent out to the load on the line 444 as it reverses itself on the capacitor 502. A diode 524 has its anode connected to ground and its cathode connected to the cathode of the SCR 440. The diode 524 prevents the cathode of the SCR 440 from assuming a voltage potential below ground. Otherwise, when the SCR 514 became conductive to divert the current previously flowing through the SCR 440 to charge the capacitor 502, the cathode of the SCR 440 would become negative due to the inductor 522. If the cathode of the SCR 440 were allowed to go negative when the SCR 514 became conductive, the SCR 440 may not be completely turned off and a miscommutation would occur.

The commutation circuitry associated with the SCR 442 operates in the same manner as the circuitry described in conjunction with the SCR 440 except that the SCR 442 will be turned off while the SCR 440 is conducting and will be conducting while the SCR 440 is turned off.

The time delay which is provided by the saturable inductor 484 is initiated at the same time that the SCR 442 is being shut off is equal to the period of time required for the SCR 442 to become nonconductive. This will prevent the SCR 440 from being turned on at the same time that the SCR 442 is conductive. If this were to happen, the voltage potential on the bus 426 would be connected directly to ground and would be undesireable.

As the frequency of the three-phase output from the static inverter 28 decreases, the motor 34 begins to appear more and more inductive causing the current in each phase of the output to the motor 34 to increasingly lag the voltage. It has been observed that the maximum current lag to the motor 34 will occur when the frequency of the static inverter 28 output is approximately 15 cycles. Since an SCR will not latch itself in a conductive state unless it has a current flowing through it at the same time that the gate signal is applied to its gate electrode, the voltage induced into the winding 478 and applied to the gate of the SCR 440 must last for a period of time equal to the worst case current lag condition. Accordingly, the core of the transformer 476 and the core of the transformer 448 must be designed to withstand the volt-seconds necessary to provide a pulse of this duration.

When the frequency of the timing signal inputs to the terminals 428 and 430 decreases below the particular frequency for which the transformers 448 and 476 were designed, the transformers will become saturated and appear as short circuits. The current limiting means including the transistor 458 and the windings 462 and 464 will limit the current flowing from the terminal 456 into the center tap 450 of the transformer 448. The current limiting means prevents a high current from damaging the windings on the transformer 448.

Assuming one of the terminals 428 or 430 has been placed at ground potential, a small amount of base to emitter leakage current will flow from the terminal 456 through the resistor 460 and to the emitter of transistor 458. The leakage current into the center tap 458 will be sufficient to induce a voltage of a few volts into the windings 462 and 464. One of the diodes 466 and 468 will become forward biased, depending upon which of the terminals 428 or 430 was grounded, supplying base current to the transistor 458 causing it to become fully conductive. If the voltage at the terminal 456 is applied to the transformer 448 for a period of time exceeding the volt-second design of its core, the transformer 448 will saturate. When the transformer 448 saturates, the voltage induced into the windings 462 and 464 will disappear, removing the base current from the transistor 458 and causing it to become substantially nonconductive. The transistor 458, however, will continue to conduct a small amount of current from the terminal 456 to the center tap 450 due to the base to emitter leakage current through the resistor 460. The current conducted by the transistor 458 when the transformer 448 has saturated is sufficiently high, one amp, for example, to maintain the transformer 448 in saturation. If the current into the center tap 450 were to be completely removed, the windings on the transformer 448 would have a voltage induced having the opposite polarity and cause the static inverter 28 to miscommutate.

Figure 6:
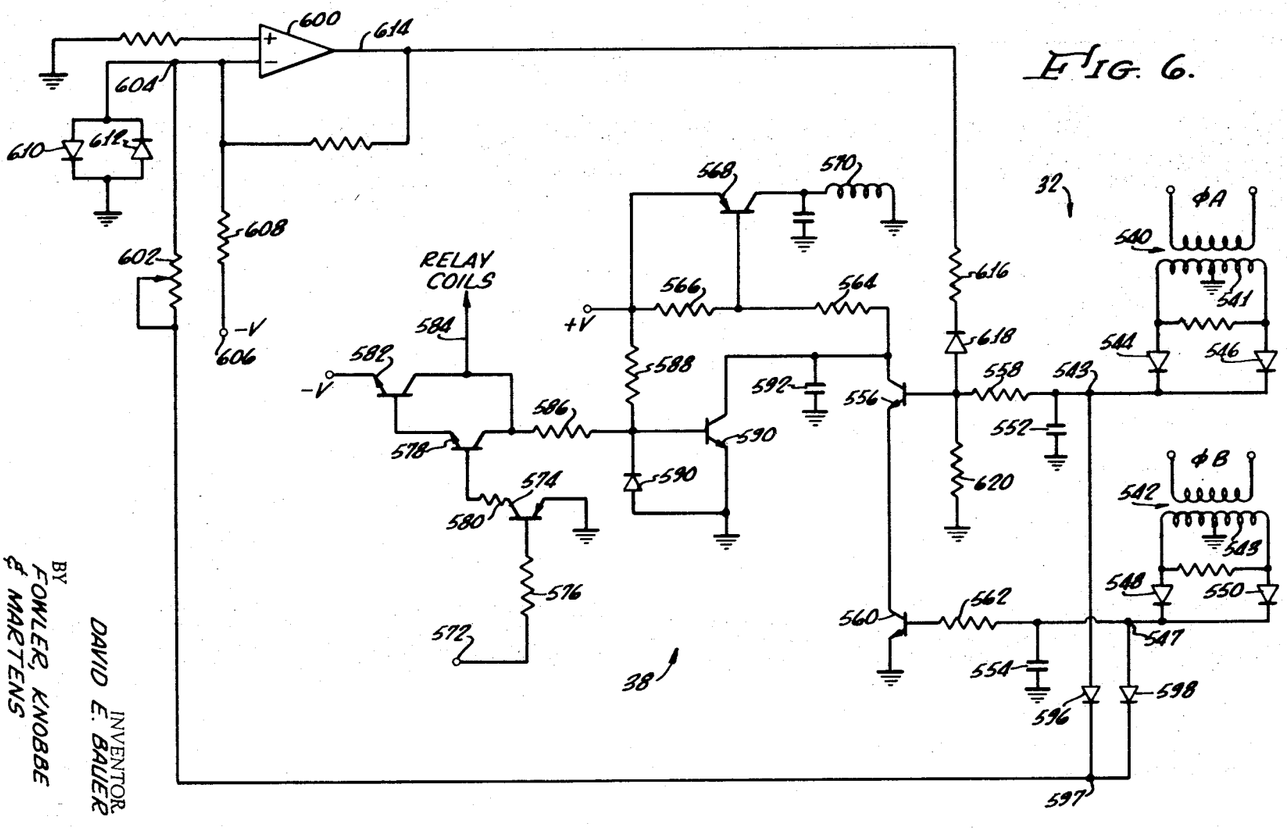
FIG. 6 is a schematic diagram of an under and over current trip circuit employed in the system of FIG. 1.

Referring now to FIG. 6, there is shown a schematic diagram of the under and over current trip 38 and the load current sensing means 32 seen in FIG. 1.

Phase A and phase B of the static inverter 28 are applied to the primary windings of current transformers 540 and 542, respectively. A secondary winding 541 on the transformer 540 has a center tap connected to ground. A diode 544 connects one side of the winding 541 to a node point 543. A second diode 546 connects the opposite side of the winding 541 to the point 543. Accordingly, the voltage induced into the winding 541 due to the current flowing in phase A is full-wave rectified and applied to the point 543.

A secondary winding 543 on the transformer 542 has a center tap connected to ground. A diode 548 connects one side of the winding 543 to a point 547. A second diode 550 connects the opposite side of the winding 543 to the point 547. The voltage induced into the secondary winding 543, therefore, is full-wave rectified and applied to the point 547.

Capacitors 552 and 554 are connected between ground and the point 543 and point 547, respectively. The capacitors 552 and 554 will filter the full-wave rectified voltage appearing at points 543 and 547. Accordingly, the voltages appearing at the points 543 and 547 are substantially DC voltages which are proportional to the current flowing in the output phases, phase A and phase B, of the static inverter 28.

The point 543 is connected to the base of a transistor 556 through a resistor 558. The point 547 is connected to the base of a transistor 560 through a resistor 562. The emitter of the transistor 560 is connected to ground and its collector is connected to the emitter of the transistor 556. The collector of the transistor 556 is connected through resistors 564 and 566 to a positive voltage potential. The transistors 556 and 560 will both be conductive so long as the voltage potentials at the points 543 and 547, respectively, exceed a predetermined minimum value. This minimum value is determined by the desired minimum current which must be flowing in the phases A and B of the static inverter 28 output. When the transistors 556 and 560 are conductive, the resistors 564 and 566 will form a voltage divider between the positive voltage potential and ground. A transistor 568 has its base connected intermediate the resistors 564 and 566 and its emitter connected to the positive voltage potential. The collector of the transistor 568 is connected through a relay coil 570 to ground. The relay 570 controls the relay contacts 95 seen in FIG. 1. The relay contacts 95 will latch the contactor 12 as previously described.

The output from the rate control means 44 on the line 46, seen in FIG. 4, is connected to a terminal 572. The voltage at the terminal 572 will be a negative voltage potential and is connected to the base of a transistor 574 through a resistor 576. The emitter of the transistor 574 is connected to ground and the collector is connected to the base of a transistor 578 through a resistor 580. The emitter of the transistor 578 is in turn connected to the base of a transistor 582. The emitter of the transistor 582 is connected to a negative voltage potential and its collector is connected to the collector of the transistor 578. The common collector junction of the transistors 578 and 582 is connected by a line 584 to the terminal 410 seen in FIG. 3. The negative voltage potential on the terminal 572 will cause the transistor 574 to become conductive, placing a ground on the base of the transistor 578 which in turn becomes conductive. The transistor 582 will become conductive when the transistor 578 becomes conductive, connecting the line 584 to the negative voltage potential.

Recall that the negative voltage potential on the terminal 410, in FIG. 3, was present at all times while the rate control means 44 generated a negative output on the line 46. The above-described circuitry is the means for performing this function.

The common collector connection of the transistors 578 and 582 is connected to the positive voltage potential through resistors 586 and 588. A transistor 590 has its base connected between the resistors 586 and 588 and its emitter connected to ground. The collector of the transistor 590 is connected to the collector of the transistor 556. A capacitor 592 is connected to ground from the common collector connection of the transistors 590 and 556. A diode 594 is connected from ground to the base of the transistor 590.

The transistor 582 will be conductive so long as the negative voltage potential appears at the terminal 572. With the transistor 582 conductive the resistors 586 and 588 will form a voltage divider between the positive voltage potential and the negative voltage potential on the emitter of the transistor 582. The values of the resistors 586 and 588 are chosen so that the voltage potential of the base of the transistor 590 is negative.

Accordingly, the transistor 590 will be nonconductive while the terminal 572 has a negative voltage applied.

During normal system operation, if it was desired to stop the motor 34, the wiper arm 160 on the potentiometer 158 would be moved to its lowest position, i.e., ground. The signal on the line 46 from the rate control means 44 could be reduced to 0 volts. With the signal on the line 46 at 0 volts, the static inverter 28 would have no current flowing in its output phases. The transistors 556 and 560, therefore, would become nonconductive due to the lack of current in phase A and phase B. The transistor 568 would become nonconductive causing the relay 570 to deactuate. When the relay 570 deactuates, the relay contacts 95 in FIG. 1 would open to deactuate the contactor 12 removing the input power to the transformer 14. The system would then be shut down. However, the transistor 590 is provided to allow the transistor 568 to remain conductive, maintaining the relay 570 actuated, under these circumstances. When the voltage on the line 46 assumes a 0 potential, the transistor 582 will become nonconductive, causing the voltage potential at the base of the transistor 590 to become positive. The transistor 590 will become conductive connecting a ground to the collector of the transistor 556. This will allow the voltage potential on the base of the transistor 568 to remain lower than the emitter potential allowing the transistor 568 to continue in a conductive state.

Assuming during system operation that the current in either phase A or phase B is reduced to a level which is less than the predetermined minimum level and the transistor 556 or the transistor 560 becomes nonconductive, the capacitor 592 will provide a ground for the collector of the transistor 556 for a period of time, 10 seconds for example. The transistor 568 will continue to conduct until the capacitor 592 has been charged to a predetermined voltage. This feature allows an under current condition to exist in one or both of the output phases for a short time. If the under current condition is present for a period of time exceeding the charge time for the capacitor 592, the transistor 568 will become nonconductive to shut down the system.

The point 543 is connected by a diode 596 to a point 597. The point 547 is connected by diode 598 to the point 597. The point 597 is connected through an adjustable resistor 602 to a summing junction 604. The summing junction 604 is connected to the inverting input of an operational amplifier 600. A negative voltage potential applied to a terminal 606 is also connected as an input to the summing junction 604 through a resistor 608. The adjustable resistor 602 may be varied so that the voltage potential at the point 597 will balance the voltage appearing at the terminal 606. Diodes 610 and 612 are connected in parallel and are oppositely poled between the summing junction 604 and ground so that the voltage at the summing junction 604 will be limited to approximately + or −0.8 of a volt. The operational amplifier 600 generates an output of a line 614 which is connected through a resistor 616 and a diode 618 to the base of the transistor 556. A resistor 620 is connected from the base of the transistor 556 to ground. The output from the operational amplifier 600 on the line 614 will cause the transistor 556 to become nonconductive if the voltage potential on either point 543 or point 547 exceeds a predetermined value. This predetermined value corresponds to a predetermined amount of current flowing in the output phases A or B. The voltage potential at the point 597 will correspond to the higher of the potentials existing at the points 543 or 547. The voltage potential at the point 597 is summed at the summing junction 604 with the voltage potential at the terminal 606. If the potential of the point 597 exceeds the predetermined value, the summing junction 604 will be positive. The operational amplifier 600 will generate a negative output on the line 614, causing the diode 618 to become forward biased reducing the voltage potential of the base of transistor 556 causing it to become nonconductive. If the voltage at the point 597 is below the predetermined level, the summing junction 604 will be negative. The operational amplifier 600 will generate a positive output on the line 614. The diode 618 will therefore be back biased and the transistor 556 will be unaffected.

I claim:

1. A system for generating a three-phase alternating output to an AC motor, said three-phase alternating output having a magnitude and a frequency which are proportionally adjustable in response to a change in the magnitude of a speed adjustment input signal to control the speed and the torque of said AC motor, said system comprising:
    an adjustable direct voltage generating means for generating a direct voltage output proportional to the magnitude of said speed adjustment signal;
    a static inverter supplied by said direct voltage for generating a three-phase alternating output having a magnitude proportional to the magnitude of said direct voltage and an adjustable frequency;
    a rate control means having said speed adjustment signal as an input for generating a rate control signal having a magnitude which is a function of the magnitude of said speed adjustment signal, said rate control means including means for generating a signal of predetermined waveform so that the maximum time rate of change of said rate control signal is limited to said predetermined waveform regardless of the time rate of change of said speed adjustment input signal, said rate control signal being coupled to said direct voltage generating means for controlling the magnitude of said direct voltage output; and
    a timing signal generating means supplied by said rate control signal for generating three-phase timing signals having a frequency proportional to the magnitude of said rate control signal, said three-phase timing signals being coupled to said static inverter to control the frequency of said static inverter three-phase alternating output.

2. The apparatus as described in claim 1 further including means responsive to the output current from said static inverter to said motor for disabling said direct voltage generating means if said output current is not within predetermined limits.

3. The apparatus as described in claim 2 wherein said direct voltage generating means limits the current supplied to said static inverter to a predetermined value.

4. The apparatus as described in claim 3 further including means responsive to a direction control input signal having two states and to said rate control signal for (i) clamping said speed adjustment input signal to ground potential when said direction control input signal changes state, (ii) releasing said clamp on said speed adjustment input signal when said rate control signal has been reduced to ground potential, and, (iii) reversing the phase rotation of said timing signals when said rate control signal has been reduced to ground potential.

5. The apparatus as described in claim 4 wherein said direct voltage generating means includes means for generating a substantially square wave voltage wave shape output having an adjustable magnitude, said voltage wave shape being independent of the magnitude of said voltage wave shape and a rectifying and filtering means for converting said square wave to said direct voltage output.

6. The apparatus as described in claim 5 wherein said square wave voltage wave shape generating means comprises a transformer having an alternating voltage input, said transformer having an EI core, a primary winding having said alternating voltage applied and a secondary winding both said windings wound on said center leg of said core, said core being divided into a first magnetic section and a second magnetic section by magnetic shunts disposed between said center leg and said outside legs separating said primary and said secondary windings, a capacitor coupled across said secondary winding for maintaining the flux in said second section of said core near saturation.

7. The apparatus as described in claim 6 wherein said transformer further includes two control windings wound on said outside legs in said second section and connected in series opposition a control current passing through said control windings reducing the voltage appearing in said secondary winding.

8. The apparatus as described in claim 7 further including transformer control means responsive to the magnitude of said rate control signal and to the magnitude of said static inverter three-phase alternating output for controlling said control current flowing through said control windings on said transformer to maintain said direct voltage generated by said direct voltage generating means proportional to said rate control signal.

9. The apparatus as described in claim 8 wherein said timing signal generating means comprises a voltage controlled oscillator having said rate control signal applied and generating a periodic output signal having a frequency proportional to the magnitude of said rate control signal.

10. The apparatus as described in claim 9 wherein said timing signal generating means further includes a ring counter having said periodic signal as an input and generating said three-phase timing signals as an output, said three-phase timing signals having a frequency proportional to the frequency of said periodic signal, each phase of said timing signals comprising complementary signals.

11. The apparatus as described in claim 10 wherein said static inverter comprises:
   three pairs of switching silicon controlled rectifiers each of said pairs having a particular phase of said three-phase timing signals applied thereto and including a first and a second switching silicon controlled rectifier, said first switching silicon controlled rectifier in each of said pairs having its anode electrode coupled to said direct voltage input to said static inverter and its cathode electrode coupled to the anode electrode of said second switching silicon controlled rectifier, the cathode electrode of said second silicon controlled rectifier being coupled to ground, a signal appearing at a phase output point intermediate the cathode electrode of said first switching silicon controlled rectifier and the anode electrode of said second switching silicon controlled rectifier being one phase of said three-phase output of said static inverter, the anode electrode of each of said switching silicon controlled rectifiers in each of said pairs being coupled to the anode electrode of an associated commutation silicon controlled rectifier, the cathode electrode of said commutation silicon controlled rectifier being series connected with a commutation capacitor to the cathode electrode of said switching silicon controlled rectifier;
   first means for applying a gate signal to the gate electrode of each of said switching silicon controlled rectifiers on alternative half cycles of said particular phase of said timing signals, said gate signal being positive with respect to the cathode electrode of said switching silicon controlled rectifier, said switching silicon controlled rectifiers in each of said pairs becoming alternately conductive during one cycle of said particular phase of said timing signals;
   second means for applying a potential to the cathode electrode of said commutation silicon controlled rectifier, said potential being negative with respect to the potential at the anode electrode of said switching silicon controlled rectifier, said negative potential charging said commutation capacitor on alternate half cycles of said particular phase of said timing signals substantially simultaneous with the application of said gate signal to said gate electrode of said switching controlled rectifier;
   third means for applying a second gate signal to the gate electrode of said commutation silicon controlled rectifiers, said second gate signal being positive with respect to the cathode electrode of said commutation silicon controlled rectifier and occuring on alternate half cycles of said particular phase of said timing signals, said alternate half cycles being 180° out of phase with said alternate half cycles of said timing signals during which said gate signal is applied to the gate electrode said switching silicon controlled rectifier.

12. The apparatus as described in claim 11 wherein said first means further includes means for delaying the application of said gate signal to said gate electrode of said switching silicon controlled rectifier for a predetermined period of time.

13. The apparatus as described in claim 12 further including a first inductor connected in parallel with said commutation silicon controlled rectifier.

14. The apparatus as described in claim 13 further including a second inductance coupled intermediate the cathode electrode of said first silicon controlled rectifier and said phase output point and a third inductance coupled between said phase output point and the anode electrode of said second switching silicon controlled rectifier.

15. The apparatus as described in claim 1 further including means responsive to a direction control input signal having two states and to said rate control signal for (i) clamping said speed adjustment input signal to ground potential when said direction control input signal changes state, (ii) releasing said clamp on said speed adjustment input signal when said rate control signal has been reduced to ground potential, and (iii) reversing the phase rotation of said timing signals when said rate control signal has been reduced to ground potential.

16. A system for generating a three-phase alternating output to an AC motor, said three-phase alternating output having a magnitude and a frequency which are proportionally adjustable in response to a change in the magnitude of a speed adjustment input signal to control the speed and the torque of said AC motor, said system comprising:
   an adjustable direct voltage generating means for generating a direct voltage output proportional to the magnitude of said speed adjustment signal;
   a rate control means having said speed adjustment signal as an input for generating a rate control signal output having a magnitude proportional to the magnitude of said speed adjustment signal and for changing the magnitude of said rate control signal at a predetermined rate in response to a change in the magnitude of said speed adjustment level, said rate control signal being coupled to said direct voltage generating means for controlling the magnitude of said direct voltage output;
   a timing signal generating means supplied by said rate control signal for generating three-phase timing signals having a frequency proportional to the magnitude of said rate control signal; and
   a static inverter having said direct voltage and said three-phase timing signals applied for generating said three-phase alternating output including,
      three pairs of switching silicon controlled rectifiers each of said pairs having a particular phase of said three-phase timing signals applied thereto and including a first and a second switching silicon controlled rectifier, said first switching silicon controlled rectifier in each of said pairs having its anode electrode coupled to said direct voltage input to said static inverter and its cathode electrode coupled to the anode electrode of said second switching silicon controlled rectifier, the of said second silicon controlled rectifier being coupled to ground, a signal appearing at a phase output point intermediate the cathode electrode of said first switching silicon controlled rectifier and the anode electrode of said second switching silicon controlled rectifier being one phase of said three-phase output of said static inverter, the anode electrode of each of said switching silicon controlled rectifiers in each of said pairs being coupled to the anode electrode of an associated commutation silicon controlled rectifier, the cathode electrode of said commutation silicon controlled rectifier being series connected with a commutation capacitor to the cathode electrode of said switching silicon controlled rectifier,
      first means for applying a gate signal to the gate electrode of each of said switching silicon controlled rectifiers on alternative half cycles of said particular phase of said timing signals, said gate signal being positive with respect to the cathode electrode of said switching silicon controlled rectifier, said switching silicon controlled rectifiers in each of said pairs becoming alternately conductive during one cycle of said particular phase of said timing signals, second means for applying a potential to the cathode electrode of said commutation silicon controlled rectifier, said potential being negative with respect to the potential at the anode electrode of said switching silicon controlled rectifier, said negative potential charging said commutation capacitor on alternate half cycles of said particular phase of said timing signals substantially simultaneously with the application of said gate signal to said gate electrode of said switching silicon controlled rectifier, third means for applying a second gate signal to the gate electrode of said commutation silicon controlled rectifiers, said second gate signal being positive with respect to the cathode electrode of said commutation silicon controlled rectifier and occuring on alternate half cycles of said particular phase of said timing signals, said alternate half cycles being 180° out of phase with said alternate half cycles of said timing signals during which said gate signal is applied to the gate electrode said switching silicon controlled rectifier.

17. The apparatus as described in claim 16 wherein said first means further includes means for delaying the application of said gate signal to said gate electrode of said switching silicon controlled rectifier for a predetermined period of time.

18. The apparatus as described in claim 17 further including a first inductor connected in parallel with said commutation silicon controlled rectifier.

19. The apparatus as described in claim 18 further including a second inductance coupled intermediate the cathode electrode of said first silicon controlled rectifier and said phase output point and a third inductance coupled between said phase output point and the anode electrode of said second switching silicon controlled rectifier.

20. The apparatus as described in claim 19 further including means responsive to the output current from said static inverter to said motor for disabling said direct voltage generating means if said output current is not within predetermined limits.

21. The apparatus as described in claim 20 wherein said direct voltage generating means limits the current supplied to said static inverter to a predetermined value.

22. The apparatus as described in claim 21 further including means responsive to a direction control input signal having two states and to said rate control signal for (i) clamping said speed adjustment input signal to ground potential when said direction control input signal changes state, (ii) releasing said clamp on said speed adjustment input signal when said rate control signal has been reduced to ground potential, and, (iii) reversing the phase rotation of said timing signals when said rate control signal has been reduced to ground potential.

23. The apparatus as described in claim 22 wherein said direct voltage generating means includes means for generating a substantially square wave voltage waveshape output having an adjustable magnitude, said voltage waveshape being independent of the magnitude of said voltage waveshape and a rectifying and filtering means for converting said square wave to said direct voltage output.

24. The apparatus as described in claim 23 wherein said square wave voltage waveshape generating means comprises a transformer having an alternating voltage input, said transformer having an EI core, a primary winding having said alternating voltage applied and a secondary winding both said windings wound on said center leg of said core, said core being divided into a first magnetic section and a second magnetic section by magnetic shunts disposed between said center leg and said outside leg separating said primary and said secondary windings, a capacitor coupled across said secondary winding for maintaining the flux in said second section of said core near saturation.

25. The apparatus as described in claim 24 wherein said transformer further includes two control windings wound on said outside legs in said second section and connected in series opposition a control current passing through said control windings reducing the voltage appearing in said secondary winding.

26. The apparatus as described in claim 23 further including transformer control means responsive to the magnitude of said rate control signal and to the magnitude of said static inverter three-phase alternating output for controlling said control current flowing through said control windings on said transformer to maintain said direct voltage generated by said direct voltage generating means proportional to said rate control signal.

27. The apparatus as described in claim 26 wherein said timing signal generating means comprises a voltage controlled oscillator having said rate control signal applied and generating a periodic output signal having a frequency proportional to the magnitude of said rate control signal.

28. The apparatus as described in claim 27 wherein said timing signal generating means further includes a ring counter having said periodic signal as an input and generating said three-phase timing signals as an output, said three-phase timing signals having a frequency proportional to the frequency of said periodic signal, each phase of said timing signals comprising complementary signals.

29. A system for generating an output signal for energizing an AC motor, comprising:
means for generating a linear ramp signal;
a static inverter for generating said output signal;
means for producing a signal to control both the frequency and level of said output signal; and
means for changing said control signal to control the torque and speed of said motor, said changing means being responsive to said ramp signal generating means to limit the rate at which said control signal may be changed to a predetermined maximum.

30. A system as defined in claim 29 wherein said ramp signal generating means comprises:
a constant current source;
an energy storage device; and
means for charging said energy storage device from said current source in response to a change in said control signal.

31. A system as defined in claim 29 wherein said ramp signal generating means produces a first and second ramp signal, and wherein said control signal changing means is responsive to said first ramp signal when said motor speed is increased, and responsive to said second ramp signal when said motor speed is reduced.

32. A system as defined in claim 29 additionally comprising:
means for reversing motor direction comprising:
means for producing a signal to initiate motor speed reversal;
means responsive to said speed reversal signal and said ramp signal for reducing motor speed to zero at a predetermined rate;
means for monitoring motor speed to determine when said motor speed is zero;
means responsive to said motor speed monitoring means and said speed reversal signal for reversing motor direction when said motor speed is zero; and
means responsive to said speed reversal signal for increasing motor speed to a predetermined level at a predetermined rate of change after operation of said motor direction reversing means.

PO-1050
(5/69)

UNITED STATES PATENT OFFICE
CERTIFICATE OF CORRECTION

Patent No. 3,577,052          Dated May 4, 1971

Inventor(s) David Elvis Bauer

It is certified that error appears in the above-identified patent and that said Letters Patent are hereby corrected as shown below:

Col. 3, line 19, "cycle" should be --cycles--;
Col. 8, line 62, "spaced" should be --speed--;
Col. 8, line 69, "noninverting" should be --non-inverting--
Col. 11, line 68, "complementary signals" should be --complementary timing signals--;
Col. 12, line 10, "31" should be --318--;
Col. 13, line 39, "terminal 392" should be --terminal 394--
Col. 16, line 22, "CV It" should be --CV=It--;
Col. 22, lines 57 and 58, "the of said second" should be --the cathode electrode of said second--;
Col. 24, line 11, "Claim 23" should be --Claim 25--.

Signed and sealed this 30th day of November 1971.

(SEAL)
Attest:

EDWARD M. FLETCHER, JR.
Attesting Officer

ROBERT GOTTSCHALK
Acting Commissioner of Pate